US011615376B2

(12) United States Patent
Bezar et al.

(10) Patent No.: US 11,615,376 B2
(45) Date of Patent: *Mar. 28, 2023

(54) TECHNIQUES FOR MANAGING FUNCTIONALITY CHANGES OF AN ON-DEMAND DATABASE SYSTEM (71) Applicant: salesforce.com, inc., San Francisco, CA (US)

(72) Inventors: Eric D. Bezar, Oakland, CA (US);
Sonali Agrawal, San Carlos, CA (US);
Varadarajan Rajaram, San Francisco, CA (US); Walter Macklem, San Francisco, CA (US); Jill Blue Lin, San Francisco, CA (US); Sriram Gopalan, Foster City, CA (US); Sandip Ghosh, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 139 days.

This patent is subject to a terminal disclaimer.

(21) Appl. No.: 16/671,857

(22) Filed: Nov. 1, 2019

(65) Prior Publication Data

US 2020/0065764 A1 Feb. 27, 2020

Related U.S. Application Data (63) Continuation of application No. 12/569,603, filed on Sep. 29, 2009, now Pat. No. 10,482,425.

(51) Int. Cl.
*G06Q 10/10* (2012.01)
*G06F 11/36* (2006.01)
*G06F 16/21* (2019.01)

(52) U.S. Cl.
CPC ......... *G06Q 10/10* (2013.01); *G06F 11/3672* (2013.01); *G06F 16/21* (2019.01)

(58) Field of Classification Search
CPC ...... G06F 11/3672; G06F 16/21; G06Q 10/10
See application file for complete search history.

(56) References Cited

U.S. PATENT DOCUMENTS 5,072,370 A 12/1991 Durdik
5,577,188 A 11/1996 Zhu
(Continued)

FOREIGN PATENT DOCUMENTS

WO 2004059420 7/2004

OTHER PUBLICATIONS

Final Office Action for U.S. Appl. No. 12/569,603 dated Feb. 20, 2015, 15 pages.

(Continued)

*Primary Examiner* — Mark D Featherstone
*Assistant Examiner* — Ranjit P Doraiswamy
(74) *Attorney, Agent, or Firm* — Kwan & Olynick LLP (57) ABSTRACT In accordance with embodiments, there are provided techniques for managing functionality changes of a database platform of a service provider. The techniques facilitate implementing changes to the database platform while minimizing work flow reductions to users of the database platform. To that end, one embodiment of the present invention delays implementation of the changes for a duration of time to provide users of the database platform an opportunity to adjust behavioral interaction with the database platform. In accordance with another embodiment of the present invention, users may implement the functional changes to determine any adverse impact on work flow, before the functional changes become permanent. In another embodiment, the users may be afforded an opportunity to selectively enable and disable the functionality changes before the duration of time expires.

20 Claims, 7 Drawing Sheets

(56) References Cited

U.S. PATENT DOCUMENTS

| | | | |
|---|---|---|---|
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,787,437 A | 7/1998 | Potterveld et al. | |
| 5,794,232 A | 8/1998 | Mahlum et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,941,947 A | 8/1999 | Brown et al. | |
| 5,950,190 A | 9/1999 | Yeager et al. | |
| 5,963,953 A | 10/1999 | Cram et al. | |
| 5,974,409 A | 10/1999 | Sanu et al. | |
| 5,987,471 A | 11/1999 | Bodine et al. | |
| 6,064,656 A | 5/2000 | Angal et al. | |
| 6,085,191 A | 7/2000 | Fisher et al. | |
| 6,092,083 A | 7/2000 | Brodersen et al. | |
| 6,112,198 A | 8/2000 | Lohman et al. | |
| 6,169,534 B1 | 1/2001 | Raffel et al. | |
| 6,178,425 B1 | 1/2001 | Brodersen et al. | |
| 6,189,000 B1 | 2/2001 | Gwertzman et al. | |
| 6,189,011 B1 | 2/2001 | Lim et al. | |
| 6,216,135 B1 | 4/2001 | Brodersen et al. | |
| 6,219,667 B1 | 4/2001 | Lu et al. | |
| 6,226,641 B1 | 5/2001 | Hickson et al. | |
| 6,233,617 B1 | 5/2001 | Rothwein et al. | |
| 6,233,618 B1 | 5/2001 | Shannon | |
| 6,256,773 B1 | 7/2001 | Bowman-Amuah | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,330,560 B1 | 12/2001 | Harrison et al. | |
| 6,336,137 B1 | 1/2002 | Lee et al. | |
| 6,341,288 B1 | 1/2002 | Yach et al. | |
| 6,345,288 B1 | 2/2002 | Reed et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,438,562 B1 | 8/2002 | Gupta et al. | |
| 6,446,089 B1 | 9/2002 | Brodersen et al. | |
| 6,446,109 B2 | 9/2002 | Gupta | |
| 6,453,038 B1 | 9/2002 | McFarlane et al. | |
| 6,457,076 B1 * | 9/2002 | Cheng | G06F 8/61 709/200 |
| 6,535,909 B1 | 3/2003 | Rust | |
| 6,549,908 B1 | 4/2003 | Loomans | |
| 6,553,563 B2 * | 4/2003 | Ambrose | G06F 8/20 717/116 |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,578,037 B1 | 6/2003 | Wong et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,148 B1 | 8/2003 | Salo et al. | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,658,417 B1 | 12/2003 | Statukis et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,721,765 B2 | 4/2004 | Ghosh et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,799,277 B2 | 9/2004 | Colvin | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,839,608 B2 | 1/2005 | Liu et al. | |
| 6,842,748 B1 | 1/2005 | Warner et al. | |
| 6,845,396 B1 | 1/2005 | Kahojia et al. | |
| 6,850,895 B2 | 2/2005 | Brodersen et al. | |
| 6,850,949 B2 | 2/2005 | Warner et al. | |
| 6,944,133 B2 | 9/2005 | Wisner et al. | |
| 6,947,927 B2 | 9/2005 | Chaudhuri et al. | |
| 7,062,765 B1 * | 6/2006 | Pitzel | G06F 8/61 709/201 |
| 7,076,633 B2 | 7/2006 | Tormasov et al. | |
| 7,080,371 B1 * | 7/2006 | Arnaiz | G06F 8/65 717/170 |
| 7,152,109 B2 | 12/2006 | Suorsa et al. | |
| 7,174,483 B2 | 2/2007 | Worrall et al. | |
| 7,185,192 B1 | 2/2007 | Kahn | |
| 7,206,805 B1 | 4/2007 | McLaughlin, Jr. | |
| 7,206,807 B2 | 4/2007 | Cheenath | |
| 7,209,929 B2 | 4/2007 | Dominguez, Jr. et al. | |
| 7,249,118 B2 | 7/2007 | Sandler et al. | |
| 7,289,976 B2 | 10/2007 | Kihneman et al. | |
| 7,305,577 B2 | 12/2007 | Zhang | |
| 7,308,704 B2 | 12/2007 | Vogel et al. | |
| 7,340,411 B2 | 3/2008 | Cook | |
| 7,350,237 B2 | 3/2008 | Vogel et al. | |
| 7,373,364 B1 | 5/2008 | Chapman | |
| 7,448,079 B2 | 11/2008 | Tremain | |
| 7,484,219 B2 | 1/2009 | Mitra | |
| 7,529,728 B2 | 5/2009 | Weissman et al. | |
| 7,577,092 B2 | 8/2009 | San Andres et al. | |
| 7,580,975 B2 | 8/2009 | Cheenath | |
| 7,599,953 B2 | 10/2009 | Galindo-Lagaria et al. | |
| 7,620,655 B2 | 11/2009 | Larsson et al. | |
| 7,657,887 B2 | 2/2010 | Kothandaraman et al. | |
| 7,661,027 B2 | 2/2010 | Langen et al. | |
| 7,693,820 B2 | 4/2010 | Larson et al. | |
| 7,734,608 B2 | 6/2010 | Fell et al. | |
| 7,769,825 B2 | 8/2010 | Karakashian et al. | |
| 7,774,366 B2 | 8/2010 | Fisher et al. | |
| 7,779,039 B2 | 8/2010 | Weissman et al. | |
| 7,814,052 B2 | 10/2010 | Bezar et al. | |
| 7,814,470 B2 | 10/2010 | Mamou et al. | |
| 7,827,138 B2 | 11/2010 | Salmon et al. | |
| 7,849,401 B2 | 12/2010 | Elza et al. | |
| 8,225,281 B1 | 7/2012 | Hardinger et al. | |
| 8,418,150 B2 | 4/2013 | Thirumalai et al. | |
| 2001/0023440 A1 | 9/2001 | Franklin et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0133392 A1 | 9/2002 | Angel et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |

(56) References Cited

U.S. PATENT DOCUMENTS

| | | |
|---|---|---|
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015578 A1 | 1/2004 | Karakashian et al. |
| 2004/0015981 A1 | 1/2004 | Coker et al. |
| 2004/0027388 A1 | 2/2004 | Berg et al. |
| 2004/0044656 A1 | 3/2004 | Cheenath |
| 2004/0045004 A1 | 3/2004 | Cheenath |
| 2004/0064503 A1 | 4/2004 | Karakashian et al. |
| 2004/0111410 A1 | 6/2004 | Burgoon et al. |
| 2004/0128001 A1 | 7/2004 | Levin et al. |
| 2004/0143645 A1 | 7/2004 | Cheenath |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0220952 A1 | 11/2004 | Cheenath |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Wiessman et al. |
| 2005/0080801 A1* | 4/2005 | Kothandaraman ..... H04L 67/02 |
| 2005/0091098 A1 | 4/2005 | Brodersen et al. |
| 2005/0223022 A1 | 10/2005 | Weissman et al. |
| 2005/0283478 A1 | 12/2005 | Choi et al. |
| 2006/0095960 A1 | 5/2006 | Arregoces et al. |
| 2006/0100912 A1 | 5/2006 | Kumar et al. |
| 2006/0136382 A1 | 6/2006 | Dettinger et al. |
| 2006/0206834 A1 | 9/2006 | Fisher et al. |
| 2007/0078705 A1 | 4/2007 | Abels et al. |
| 2007/0088741 A1 | 4/2007 | Brooks et al. |
| 2007/0124276 A1 | 5/2007 | Weissman et al. |
| 2007/0130130 A1 | 6/2007 | Chan et al. |
| 2007/0130137 A1 | 6/2007 | Oliver et al. |
| 2007/0150303 A1 | 6/2007 | Cheenath |
| 2007/0150546 A1 | 6/2007 | Karakashian et al. |
| 2007/0156714 A1 | 7/2007 | Becker |
| 2007/0226640 A1 | 9/2007 | Holbrook et al. |
| 2008/0010243 A1 | 1/2008 | Weissman et al. |
| 2008/0040196 A1 | 2/2008 | Coon et al. |
| 2008/0077566 A1 | 3/2008 | Fell et al. |
| 2008/0082540 A1 | 4/2008 | Weissman et al. |
| 2008/0082555 A1 | 4/2008 | Salmon et al. |
| 2008/0082572 A1 | 4/2008 | Ballard et al. |
| 2008/0082986 A1 | 4/2008 | Cheenath et al. |
| 2008/0086358 A1 | 4/2008 | Doshi et al. |
| 2008/0086447 A1 | 4/2008 | Weissman et al. |
| 2008/0086479 A1 | 4/2008 | Fry et al. |
| 2008/0086482 A1 | 4/2008 | Weissman et al. |
| 2008/0086514 A1 | 4/2008 | Weissman et al. |
| 2008/0086567 A1 | 4/2008 | Langen et al. |
| 2008/0086735 A1 | 4/2008 | Cheenath et al. |
| 2008/0126333 A1 | 5/2008 | Bezar et al. |
| 2008/0147753 A1* | 6/2008 | Chasman ............. G06F 16/273 |
| | | 707/999.203 |
| 2008/0155310 A1 | 6/2008 | Langen et al. |
| 2008/0162544 A1 | 7/2008 | Weissman et al. |
| 2008/0201701 A1* | 8/2008 | Hofhansl ................. G06F 8/61 |
| | | 717/168 |
| 2008/0215560 A1 | 9/2008 | Bell et al. |
| 2008/0270354 A1 | 10/2008 | Weissman et al. |
| 2008/0270987 A1 | 10/2008 | Weissman et al. |
| 2008/0295092 A1* | 11/2008 | Tan ........................ G06Q 30/04 |
| | | 717/178 |
| 2009/0030906 A1 | 1/2009 | Doshi et al. |
| 2009/0049065 A1 | 2/2009 | Weissman et al. |
| 2009/0049101 A1 | 2/2009 | Weissman et al. |
| 2009/0049102 A1* | 2/2009 | Weissman ................ G06F 8/70 |
| 2009/0049288 A1 | 2/2009 | Weissman et al. |
| 2009/0132690 A1* | 5/2009 | Hafez ................ G06Q 30/0603 |
| | | 709/223 |
| 2009/0177744 A1 | 7/2009 | Marlow et al. |
| 2009/0276395 A1 | 11/2009 | Weissman et al. |
| 2009/0276405 A1 | 11/2009 | Weissman et al. |
| 2009/0282045 A1 | 11/2009 | Hsieh et al. |
| 2009/0319529 A1 | 12/2009 | Bartlett et al. |
| 2010/0057504 A1 | 3/2010 | Baeuerle et al. |
| 2010/0205216 A1 | 4/2010 | Durdik |
| 2010/0191719 A1 | 7/2010 | Weissman et al. |
| 2010/0211548 A1* | 8/2010 | Ott .......................... G06F 16/27 |
| | | 707/655 |
| 2010/0211619 A1 | 8/2010 | Weissman et al. |
| 2010/0223284 A1 | 9/2010 | Brooks et al. |
| 2010/0235837 A1 | 9/2010 | Weissman et al. |
| 2010/0250748 A1* | 9/2010 | Sivasubramanian ........................ |
| | | G06F 11/3442 |
| | | 709/226 |
| 2010/0257513 A1* | 10/2010 | Thirumalai ......... G06F 16/2365 |
| | | 717/134 |
| 2010/0274779 A1 | 10/2010 | Weissman et al. |

OTHER PUBLICATIONS

Final Office Action for U.S. Appl. No. 12/569,603 dated Feb. 8, 2018, 17 pages.

Final Office Action for U.S. Appl. No. 12/569,603 dated Jul. 26, 2016, 17 pages.

Final Office Action for U.S. Appl. No. 12/569,603 dated May 24, 2012, 11 pages.

Non-Final Office Action for U.S. Appl. No. 12/569,603 dated Jun. 14, 2017, 15 pages.

Non-Final Office Action for U.S. Appl. No. 12/569,603 dated Mar. 14, 2019, 16 pages.

Non-Final Office Action for U.S. Appl. No. 12/569,603 dated Mar. 17, 2016, 16 pages.

Non-Final Office Action for U.S. Appl. No. 12/569,603 dated Sep. 27, 2011, 16 pages.

Non-Final Office Action for U.S. Appl. No. 12/569,603 dated Sep. 3, 2014, 13 pages.

Notice of Allowance for U.S. Appl. No. 12/569,603 dated Jul. 30, 2019, 7 pages.

International Preliminary Report on Patentability for PCT/US2010/050021 dated Apr. 3, 2012, 5 pages.

International Search Report and Written Opinion for PCT/US2010/050021 dated Dec. 28, 2010, 7 pages.

Lee et al: "Composition of executable business process models by combining business rules and process flows", Expert Systems With Applications, Oxford, GB, vol. 33, No. 1, Dec. 22, 2006 (Dec. 22, 2006), pp. 221-229.

Ralph Mietzner et al: "Combining Different Multi-tenancy Patterns in Service-Oriented Applications", Enterprise Distributed Object Computing Conference, 2009. EDOC '09. IEEE International, IEEE, Piscataway, NJ, USA, Sep. 1, 2009, pp. 131-140.

Mingxue Wang et al: "Integrated Constraint Violation Handling for Dynamic Service Composition", Services Computing, 2009. SCC '09. IEEE International Conference on, IEEE, Piscataway, NJ, USA, Sep. 21, 2009 (Sep. 21, 2009), pp. 168-175.

Wermelinger M. et al: "Using coordination contracts for flexible adaptation to changing business rules" Software Evolution 2003. Proceedings. 6th International Workshop on Principles of Sep. 1-2, 2003, Piscataway, NJ, USA, IEEE, Sep. 1, 2003, pp. 115-120.

(56) References Cited

OTHER PUBLICATIONS

Zhi Hu Wang et al: "A Study and Performance Evaluation of the Multi-Tenant Data Tier Design Patterns for Service Oriented Computing", E-Business Engineering, 2008. ICEBE '08, IEEE International Conference on, IEEE, NJ, USA, Oct. 22, 2008, pp. 94-101.
[online]; [published on Oct. 17, 2008]; [retrieved on Feb. 26, 2010]; retrieved from http://en.wikipedia.org/wiki/Push_technology.
[online]; [published on Oct. 16, 2008]; [retrieved on Feb. 26, 2010]; retrieved from http://en.wikipedia.org/wiki/Customer_Relationship_Management.
[online]; [published on Apr. 22, 2008]; [retrieved on Feb. 26, 2010]; retrieved from http://en.wikipedia.org/wiki/Flat_file_database.
[online]; [published on Apr. 25, 2008]; [retrieved on Feb. 26, 2010]; retrieved from http://en.wikipedia.org/wiki/Relational_database.
First named inventor: Yancey, Scott, U.S. Appl. No. 12/636,658, filed Dec. 11, 2009.
First named inventor Yancey, Scott, U.S. Appl. No. 12/636,675, filed Dec. 11, 2009.
First named inventor: Doshi, Kedar, U.S. Appl. No. 12/167,991, filed Jul. 3, 2008.
First named inventor: Yancey, Scott, U.S. Appl. No. 12/197,979, filed Aug. 25, 2008.
First named inventor: Yancey, Scott, U.S. Appl. No. 12/132,409, filed Jun. 3, 2008.
First named inventor: Durdik, Paul, U.S. Appl. No. 12/549,349, filed Aug. 27, 2009.
Lee et al: "Composition of executable business process models by combining business rules and process flows", Expert Systems With Application, Oxford, GB, vol. 33, No. 1, Dec. 22, 2006, pp. 221-229.
Mietzer et al: "Combining Different Multi-tenancy Patterns in Service Oriented Applications", IEE International Enterprise Distributed Object Computing Conference, NJ, USA, Sep. 1, 2009, pp. 131-140.
Wang et al: "Integrated Constraint Violation Handling for Dynamic Services Composition", IEE International Conference on Services Computing, NJ, USA, Sep. 21, 2009, pp. 168-175.
Wermelinger et al: "Using coordination contracts for flexible adaptation to changing business rules", Proceedings of the Sixth International Workshop on Software Evolution, NJ, USA, Sep. 1, 2003, pp. 115-120.
Wang et al: "A Study and Performance Evaluation of the Multi-Tenant Data Tier Design Patterns for Service Oriented Computing", IEE International Conference on E-Business Engineering, NJ, USA, Oct. 22, 2018, pp. 94-101.
Notification of Transmittal of the International Search Report and the Written Opinion of the International Searching Authority, or the Declaration. International Application No. PCT/US2010/050021. International Filing Date: Sep. 23, 2010.
First named inventor: Calahan, Patrick, U.S. Appl. No. 12/954,556, filed Nov. 24, 2010.
First named inventor: Varadharajan, Arunkumaran, U.S. Appl. No. 12/909,820, filed Oct. 21, 2010.
First named inventor: Pin, Oliver, U.S. Appl. No. 12/895,833, filed Sep. 30, 2010.
First named inventor: Press, William A., U.S. Appl. No. 12/850,502, filed Aug. 4, 2010.
First named inventor: Tanaka, Jay, U.S. Appl. No. 12/831,209, filed Jul. 6, 2010.
First named inventor: Tanaka, Jay, U.S. Appl. No. 12/831,196, filed Jul. 6, 2010.
First named inventor: Williams, Alexis, U.S. Appl. No. 13/028,236, filed Feb. 16, 2011.
First named inventor: Yancey, Scott, U.S. Appl. No. 12/720,538, filed Mar. 9, 2010.
[online];[published on Oct. 16, 2008];[retrieved on Feb. 26, 2010]; retrieved from http://en.wikipedia.org/wiki/Customer_Realtionship_Management.
First named inventor: Durdik, Paul, U.S. Appl. No. 12/369,710, filed Feb. 11, 2009.

* cited by examiner

TECHNIQUES FOR MANAGING FUNCTIONALITY CHANGES OF AN ON-DEMAND DATABASE SYSTEM

CLAIM OF PRIORITY

This patent application is a continuation of U.S. patent application Ser. No. 12/569,603, filed Sep. 29, 2009, now 10,482,425 with an issue date of Nov. 19, 2019, which is hereby incorporated by reference in its entirety for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

Embodiments of the present invention relate generally to databases and more particularly to techniques for managing functionality changes associated with an on-demand multi-tenant database system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches that, in and of itself, may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The efficient retrieval of accurate information and subsequent delivery of this information to the user system has been and continues to be a goal of administrators of database systems. Unfortunately, conventional database approaches might become inefficient if, for example, updating applications or otherwise changing the functionality of the database system, in the presence of complex data structures.

Accordingly, it is desirable to provide techniques to enable an owner of a database system to maintain the availability of the database system to users while providing changes to the functionality of the same.

BRIEF SUMMARY

In accordance with embodiments, disclosed are techniques for managing functionality changes of an on-demand database system. The techniques facilitate implementing functionality changes to the database system while minimizing work flow reductions to users of the database system. In an embodiment, and by way of example, a method of managing functionality changes of an on-demand database system, the method comprising: determining whether a portion of a production environment of the on-demand database architecture includes tenant-specific business logic; in response to determining the portion includes tenant-specific business logic, providing to a user system associated with a user of the portion an interface including information related to the functionality changes; and implementing the functional changes after a duration of time.

The present invention is described with reference to an embodiment in which an apparatus facilitates implementing functionality changes to an on-demand database system. Although the invention is discussed with respect to supporting multiple tenants; the present invention is not limited to multi-tenant database systems. Embodiments may be practiced using other database architectures, i.e., ORACLE®, D82® by IBM and the like without departing from the scope of the embodiments claimed. Any of the above embodiments may be used alone or together with one another in any combination. Invent ions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Systems and methods are provided to manage functionality changes of a multi-tenant on-demand database system. As used herein, the term multi-tenant database system (MTS) refers to those systems in which various elements of hardware and software of the database system may be shared by a multiplicity of users. For example, a given application server may simultaneously process requests for a great number of customers, and a given database table may store rows for a potentially much greater number of customers. It will be appreciated that multitenancy in a database is not merely an extension of adding additional users, since such direct and obvious extensions quickly become unworkable as a data type, because data type, security, schema, sharing, intra/inter tenant and characteristics compound exponentially with linear increments of users. Rather, unique and heretofore unknown techniques in database management of the disclosed embodiments can provide the ability to house such disparate data types and characteristics while circumventing the exponential growth in complexity and related access delays, making multi-tenancy a newly obtainable and previously unknown reality.

Figure 1:
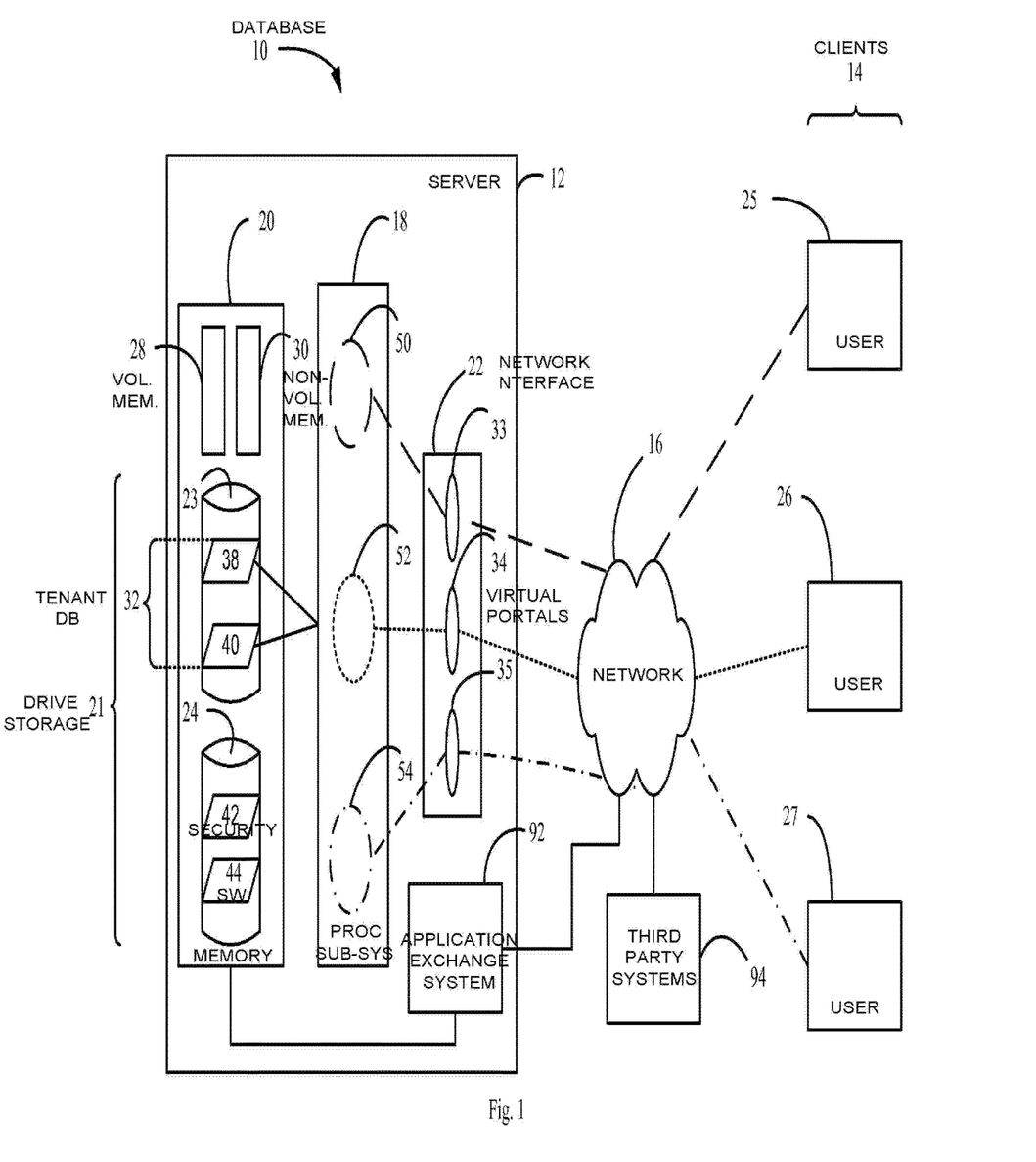
FIG. 1 illustrates a representative architecture of a multi-tenant database system in accordance with one embodiment of the present invention.

FIG. 1 illustrates a database architecture 10 that includes server side facilities 12 and client side facilities 14 in data communication over a network 16. Server side facilities 12 includes processor sub-system 18, memory space 20, in data communication therewith, and network interface resources 22 in data communication with both memory space 20 and processor sub-system 18. Processor sub-system 18 may be any known processor sub-system in the art, e.g., the CORE DUO® or the CORE 2 DUO® from Intel Corporation of Santa Clara, Calif. Memory space 20 includes drive storage 21, shown as one or more hard drives 23 and 24, as well as data and instruction registers, shown as 28, and volatile and non-volatile memory shown as 30. Data communication network 16 may be any network or combination of networks of devices that communicate with one another. Network 16 can be any one or any combination of a LAN (local area network), WAN (wide area network), telephone network, wireless network, point-to-point network, star network, token ring network, hub network, or other appropriate configuration. As one of the most common type of computer network in current use is a TCP/IP (Transfer Control Protocol and Internet Protocol) network, such as the global inter-network of networks often referred to as the "Internet" with a capital "I," that network will be used in many of the examples herein. However, it should be understood that the networks that the present invention might use are not so limited, although TCP/IP is a frequently implemented protocol.

Server side facilities 12 provide access to a database 32 by multiple users 25-27 of client side facilities 14 over data communication network 16. To that end, network interface resources 22 include a plurality of virtual portals 33-35. Each virtual portal 33-35 provides an "instance" of a portal user interface coupled to allow access to database 32. Typically, tenants obtain rights to store information, referred to as tenant information 38 and 40, on database 32 and make the same accessible to one or more users 25-27 to whom the tenant provides authorization. This is typically achieved by rental agreements between the tenant and an owner/provider of architecture 10 and/or other tenants. In this manner, architecture 10 provides an on-demand database service to users 25-27 that are not necessarily concerned with building and/or maintaining the database system; rather, these functions are addressed between the tenant and the owner/provider.

With architecture 10, multiple users 25-27 associated with multiple tenants may access database 32 through a common network address, in this example a universal resource locator (URL). In response, web-pages and/or other content may be provided to users 25-27 over network 16. The resources of database 32 that users 25-27 may access can be different, depending on user's 25-27 security or permission level and/or tenant association. As a result, data structures included in tenant information are managed so as to be allocated at the tenant level, while other data structures might be managed at the user level. Because architecture 10 supports multiple tenants including possible competitors, security protocols 42 and other system software 44, stored for example on hard drive 24, maintain applications and applications' use to only those users 25-27 with corresponding access rights. Also, because many tenants may desire access to architecture 10 rather than maintain their own system, redundancy, up-time, and backup are additional functions that may be implemented in architecture 10. In addition to user-specific data and tenant specific data, server side facilities 12 might also maintain system level data usable by multiple tenants, users, groups of users, other systems and/or other data. Such system level data might include industry reports, news, postings, and the like that are sharable among tenants.

For example, in certain embodiment s architecture 10 may allow users 25-27 associated with one or more of the tenants, referred to as tenant users, access to a sub-portion of the content of the database information that the tenant may be allowed to access. The sub-portion that any one of users 25-27 may access may be the same as, or different from, the sub-portion that the remaining users 25-27 may access. Users 25-27 not associated with a tenant or otherwise not having permission to access data of the tenant would not be allowed access to information 38 and 40. For example, assume users 25 and 26 are associated with the tenant corresponding to tenant information 38 and not associated with the tenant corresponding to tenant information 40. Users 25 and 26 would not be allowed access to tenant information 40 and would be allowed access to tenant information 38 or a sub-portion thereof. In the present example, user 25 may be allowed access to a first portion of tenant information 38 and user 26 may be allowed access to a second portion of tenant information 38, which is mutually exclusive. Similarly, were user 27 associated with the tenant corresponding to tenant information 40 and not the tenant corresponding to tenant information 38, user 27 would be allowed to access tenant information 40, or a portion thereof, and not tenant information 38. It is possible that one of users 25-27 is associated with the tenants corresponding to both sets of tenant information 38 and 40.

Virtual portals 33, 34 and 35 facilitate providing resources of database 32 on behalf of a tenant to users 25-27 associated with the tenant. Each user 25-27 logs into one of virtual portals 33, 34 and 35 to access resources of database 32 through a unique uniform resource locator (URL) or other type of address. Based on the URL and other identifying information associated with users 25-27, architecture 10 may determine the resources of database 32 users 25-27 may access. For example, user 25 communicates with database through virtual portal 33, user 26 communicates with database 32 through virtual portal 34, and user 27 communicates with database through virtual portal 35. It is possible, however, that all users 25-27 may use a common portal, as well. To that end, users 25-27 desiring to access resources of database 32 employ virtual portals 33, 34 and 35 to validate against the information stored on architecture 10, corresponding to the user 25-27 requesting access to a sub-portion of content on database 32. The communications between users 25-27 and server side facilities 12 results in multiple processes 50, 52 and 54 being executed by processor sub-system 18. Thus, it is desired that processor sub-system 18 be capable of providing uninterrupted interaction with users 25-27.

Figure 2:
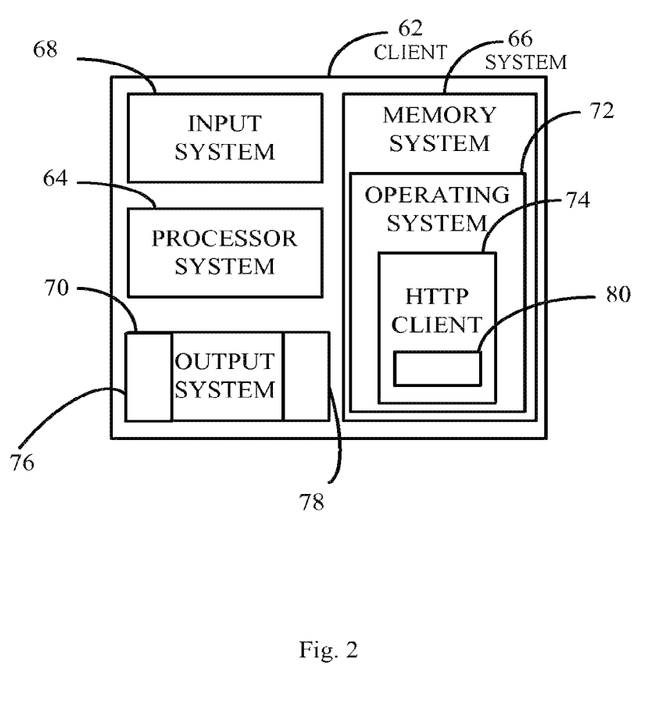
FIG. 2 is a detailed block diagram of a user system used in connection with the architecture of FIG. 1.

Referring to both FIGS. 1 and 2, each of users 25-27 communicates with one of virtual portals 33, 34 and 35 employing a client system 62. Client system 62 may include a processor system 64, a memory system 66, an input system 68, and output system 70. Processor system 64 may be any combination of one or more processors. Memory system 66 may be any combination of one or more memory devices, volatile, and/or non-volatile memory. A portion of memory system is used to run operating system 72 in which HTTP client 74 executes. Input system 68 may be any combination of input devices, such as one or more keyboards, mice, trackballs, scanners, cameras, and/or interfaces to networks. Output system 70 may be any combination of output devices, such as one or more monitors 76, printers (not shown), speaker 78 and/or interfaces to networks. HTTP client 74 allows users 25-27 of client systems 62 to access, process and view information, pages and applications available to it from architecture 10 over network 16. Examples of HTTP client 74 include various browsing applications, such as Microsoft's Internet Explorer browser, Netscape's Navigator browser, Opera's browser, or a WAP-enabled browser in the case of a cell phone, PDA or other wireless device, or the like. Access is gained to requisite tenant information 38 and 40 by entering the URL (not shown) into the URL box 80 of HTTP client 74. The URL directs users 25-27 to the appropriate virtual portal for to determine authorization and permission Level to access the requisite tenant information.

Figure 3:
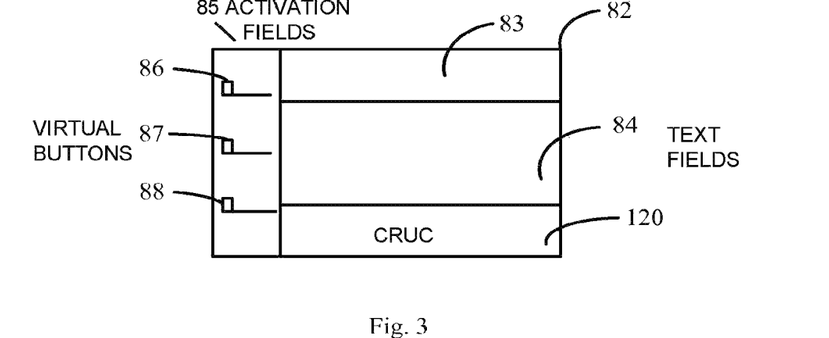
FIG. 3 is a simplified block diagram of a configuration page that appears on a monitor of the user system shown in FIG. 2.
Figure 4:
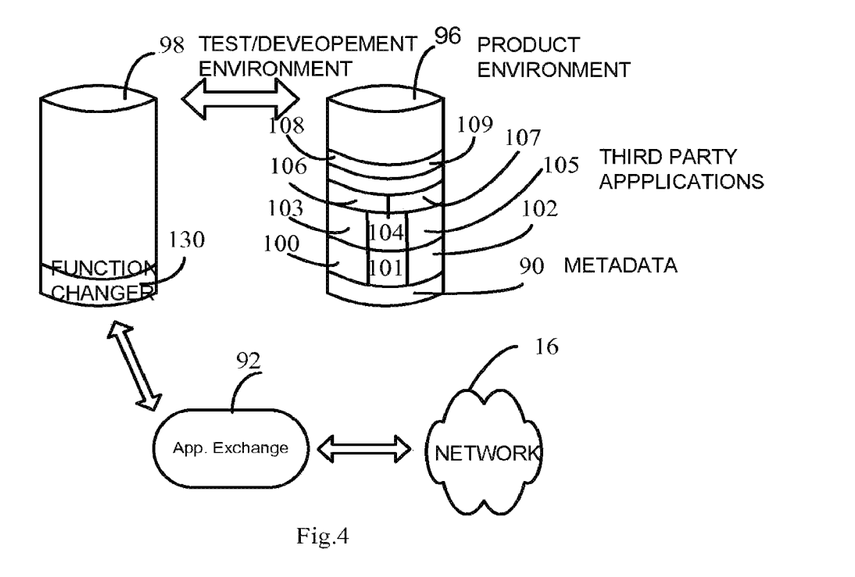
FIG. 4 is a simplified plan view showing the functional interaction of the various software components of the architecture shown in FIG. 1.

Referring to FIGS. 1, 2 and 3, it is desired that a tenant has the capability to provide custom enhancements to the experience of users 25-27 of architecture 10 that are associated with the tenant. To that end, architecture includes operations that allow a tenant to provide customized functionality to users' 25-27 experience with database 32. This is typically achieved after the user, associated with the tenant and authorized to effectuate functionality changes, gains access to database 32. For example, were such a user to access database 32, a configuration page 82 is displayed on the user system 62. Configuration page 82 includes a plurality of text fields, 83 and 84, as well as an activation field 85 that includes one or more virtual buttons, shown as 86-88 to facilitate establish custom functionalities. For example, virtual button 86 may launch a web page (not shown) that facilitates configuring database 32, by augmenting or diminishing, standardized database operations that are included in a common database schema 90, discussed more fully below with respect to FIG. 4, provided by the owner of architecture 10, shown in FIG. 1. Examples of standardize operations that may be performed on tenant information 38 and 40 include but are not limited various queries and sorting routines commonly associated with database operations that may be employed to operate on data in the tables and/or classes. Additionally, common database schema 90, shown in FIG. 4, may include other information that may be customized by a tenant to provide a desired look-and-feel to user interfaces that may be configured by users 25-27, shown in FIG. 1. The operations and look-and-feel provided to users 25-27 is established by configuration information included in common schema 90, shown in FIG. 4.

Referring to both FIGS. 1 and 3, virtual button 87 may launch a web page (not shown) that allows tenant to configure the functionality of database 32 using custom generated code, for example, created using a proprietary language. In this manner, each tenant may provide work flow rules, and other functionality, which may be referred to commonly as customization information which allows a great amount of customization to database 32 in addition to that afforded by the common schema. An example of a work flow rule may include a maximum value for a given set of values as in the case of provide a discount to the purchase of multiple products/services with there being an aggregate maximum to the discount provided. Another example may include notification by one of users 25-27 of access to database 32 by one of the remaining users 25-27. The work flow rules are typically written in the APEX™ language available from salesforce.com, inc. of San Francisco, Calif. and are developed by each tenant of architecture 10.

Referring again to both FIGS. 1 and 3, virtual button 88 launches a web page (not shown) that allows access to an application exchange system 92 included in server side facilities 12. Application exchange system 92 provides a tenant to an opportunity to review, test and implement functionality enhancements to database 32 developed by third parties, which are independent of the owner of architecture 10 and tenant. Application exchange system 92 is in data communication with network 16 outside of network interface resources 22 using client system 62. Application exchange system 92 facilitates communication between third party systems 94 and users 25-27 for, inter alia, sharing software and other enhancements for users' 25-27 manipulation of content of database 32. Third party systems 94, which may consist of systems similar and/or identical to client system 62, do not have access to the contents of server side facilities 1 2, excepting for the storage and advertisement of functional enhancements on application exchange system 92. If desired, users 25-27 may access application exchange system 92 through network interface resources 22, as well as directly through network 16. Application exchange system 92 may include standard access restrictions to ensure that third parties which provide functional enhancements to users 25-27 experience with the content of database 32 do so with compatible technology.

Referring to both FIGS. 1 and 4, server side facilities 12 functions as two separate computational environments: a production environment 96 and a test and development environment 98. Specifically, the operation of security protocols 42 and system software 44 present, to tenants, test and development environment 98 that operates independently of production environment 96. In this manner, enhancements to the operation of database 32 with respect to tenant information 38 and 40 may be tested before being applied to production environment 96. For example, security protocols 42 and system software 44 provide a common database schema 90 that enable each tenant to perform a set of functions that are standardize database operations on tenant information 38 and 40. To that end, tenant information 38 and 40 may be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein.

The configuration information and the customization information are defined primarily by sets, which in the present example are shown as three sets, of metadata 100, 101 and 102, one for each of users 25-27. Each set of metadata 100, 101 and 102 is stored in production environment 96 that is used to call desired functionality with respect to tenant information 38 and 40. Each set of metadata 100, 101 and 102 is tenant specific. Also, stored in production environment 96 are third party applications 103-109. Third party applications may also be tenant specific in that the same are called by the metadata 100-102 associated with the tenant. Specifically, metadata 100-102 is configured to allow the tenant to obtain the desired functionality of the third-party applications operating on tenant information 38 and 40. The corresponding tenant information 38 and 40, metadata sets 100, 101, 102 and third party applications 103-109 constitute a tenant-specific production environment for a given tenant. The configuration information, customization information and third party applications associated with a specific tenant are collectively referred to as tenant-specific business logic.

Test and development environment 98 facilitates determining the operational characteristics of tenant-specific business logic before deploying the same on production environment 96. In this manner, the operational characteristics of production environment 96 are maintained during development of intended changes to the functionality of the same, referred to as putative functional changes. This reduces, if not avoids, interruption s of the operation of production environment 96. To that end, a tenant would copy tenant information 38 and 40 and any existing tenant-specific business logic to test and development environment 98, forming a test tenant-specific production environment. The putative functional changes would then be applied to the test tenant-specific production environment deployed to determine whether the operational characteristics of existing tenant-specific business logic are maintained. It may be that the putative functional changes degrade and/or alter the existing tenant-specific business logic necessitating further development to obtain a desired operational characteristic. Upon achieving the operational characteristics with the existing tenant-specific business logic and the putative functional changes, the tenant-test production environment may be characterized as a putative tenant-specific production environment. The putative tenant-specific production environment may be deployed into the production environment 96 for operation by the appropriate users associated with the tenant. The putative tenant-specific production environment deployed to the production environment 96 is referred to as the new tenant-specific production environment as after deployment. After deployment of the putative tenant-specific production environment to the production environment 96, the copy of the same is then erased or otherwise removed from test and development environment 98.

Referring to FIGS. 1, 2 and 3 it should be understood that deployment of a putative tenant-specific production environment may produce deleterious effects for the tenant's users, even if the same provides desired operational characteristics. Examples of deleterious effects include reducing the efficiency of and/or disrupting a user's operation of architecture 10. To minimize the deleterious effects of functionality changes one aspect of the present invention provides notice of the existence of a putative tenant-specific production environment and delays implementation of putative tenant-specific production environment for a duration of time. The delay may be established based upon several parameters, including a decision by the party implementing the functional changes.

For example, were the owner of architecture 10 to implement functionality changes tenant-specific production environments on architecture 10, a notice may be sent to the appropriate tenant s, i.e., tenants with tenant-specific environments that will undergo functionality changes. In one example, a critical update console ("CRUC") 120 may be included in a set-up page 82 that is transmitted to one of users 25-27 on monitor 76 of a user system 602. Specifically, in response to gaining access to architecture 10 the user 25-27 receives CRUC 120 that includes several text fields 121-123 and one or more activation fields 124, 125 and 126, shown more clearly in FIG. 5.

Figure 5:
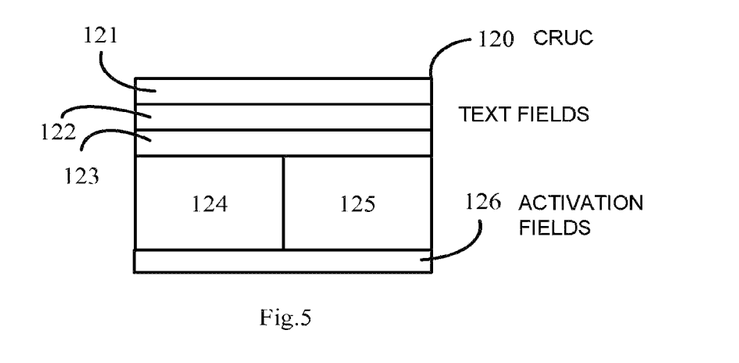
FIG. 5 is a detailed block diagram of a critical update console included in the configuration page shown in FIG. 3, in accordance with one embodiment of the present invention.

Referring to both FIGS. 1 and 5, text field 121 includes information concerning the changes to the functions of architecture 10 to which users 25-27 will be subjected. Text field 122 includes information describing the underlying reasons for the functionality change. Text field 123 includes information describing when the functionality changes become permanent through, for example, automatic activation of the same. Activation field 124 operates to allow users 25-27 to transmit to the party implementing the functional changes, in this example, the owner of architecture 10, an indication that the functionality changes should be deployed immediately and permanently, e.g., before the duration of time expires at which time the functionality changes become automatically activated permanently. Activation field 125 operates to allow users 25-27 to transmit to the party implementing the functional changes an indication that the functionality changes should be deployed immediately and temporarily, e.g., before the duration of time expires at which time the functionality changes become automatically activated permanently. In this manner, users 25-27 may be provided an opportunity to test the functionality changes. Activation field 126 operates to allow the user 25-27 to transmit to the party implementing the functional changes an indication that the functionality changes should be ceased, after being immediately temporarily. It should be under stood that activation fields may be active only before the expiration of the duration, i.e., before automatic activation of the functionality changes at which time the functionality changes become permanent.

With this configuration, putative functionality changes to a tenant-specific production environment are deferred so as to provide users 25-27 an opportunity to assess the effect of the functionality changes on the current tenant production environment and their interaction therewith. This is particularly useful as it affords the user s 25-27 an opportunity to determine whether any of the work flow rules and third party applications or any other tenant-specific metadata and code would work properly in view of the impending functionality changes to the tenant-specific production environment. Moreover, activation fields 125 and 126 allow users to temporarily test the functionality change s to as to provide a real-time experience of the impact of the functionality changes and affords an opportunity to establish a level of efficient with the putative functionality changes. Were a user to prove dissatisfied with the functionality changes, e.g., not having the skill or ability to efficiently use the same, the user could revert back to the tenant-specific production environment that did not include the putative functionality changes. In this manner, the user may gain efficiency with the putative functionality changes without compromising their overall efficiency of their interactions with architecture 10. To that end, putative functionality changes are typically maintained in test and development environment 98, shown as 130, and until the automatic activation occurs, at which point in time pending functionality changes 130 for a tenant-specific production environment are deployed. Thus, it is realized that CRUC 120 allows concurrent access to multiple production environments for users of a common tenant. However, any given user of architecture may access the multiple tenant-specific production environments, sequentially.

Figure 6:
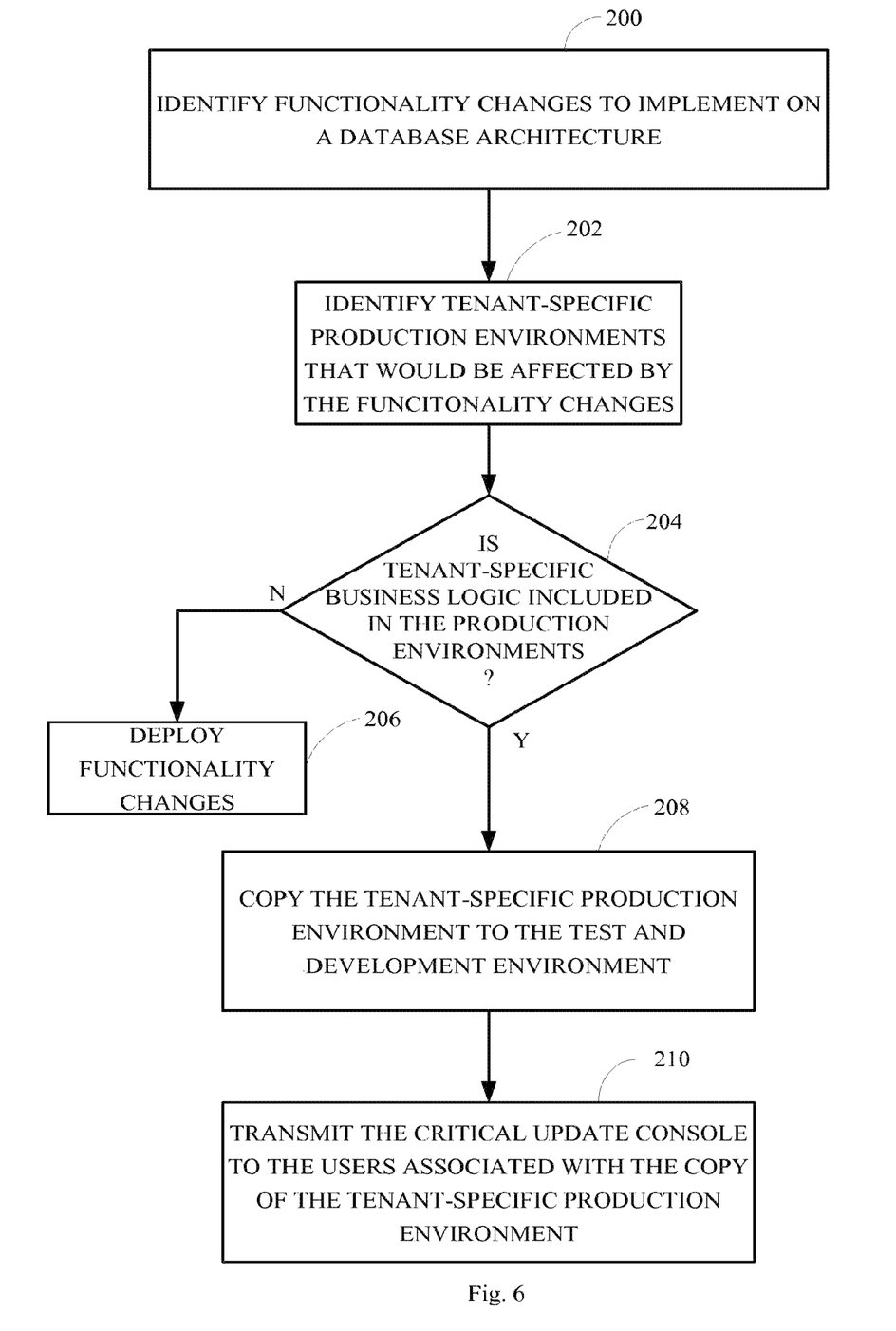
FIG. 6 is a flow diagram showing a method of implementing functionality change notification to users of the architecture shown in FIG. 1, in accordance with one embodiment of the present invention.

Referring to FIGS. 1 and 6, in accordance with an embodiment of the present invention, the owner of architecture 10 identifies functionality changes to implement on architecture 10 at step 200. At step 202, identified are tenant-specific production environments that would be affected by the functionality changes. For each of the tenant-specific production environments it would be determined whether tenant-specific business logic was included, at step 204. Were no tenant-specific business logic present, the functionality changes would be deployed, at step 206. Were tenant-specific business logic present, then step 208 would occur, during which a copy of the tenant-specific production environment would be copied to the test and development environment to which the functionality changes would be included. At step 210, CRUC 120 would be transmitted to users gaining access to architecture 10 and associated with the tenant-specific production environment indicating that the functional changes would be implemented after a duration of time.

Figure 7:
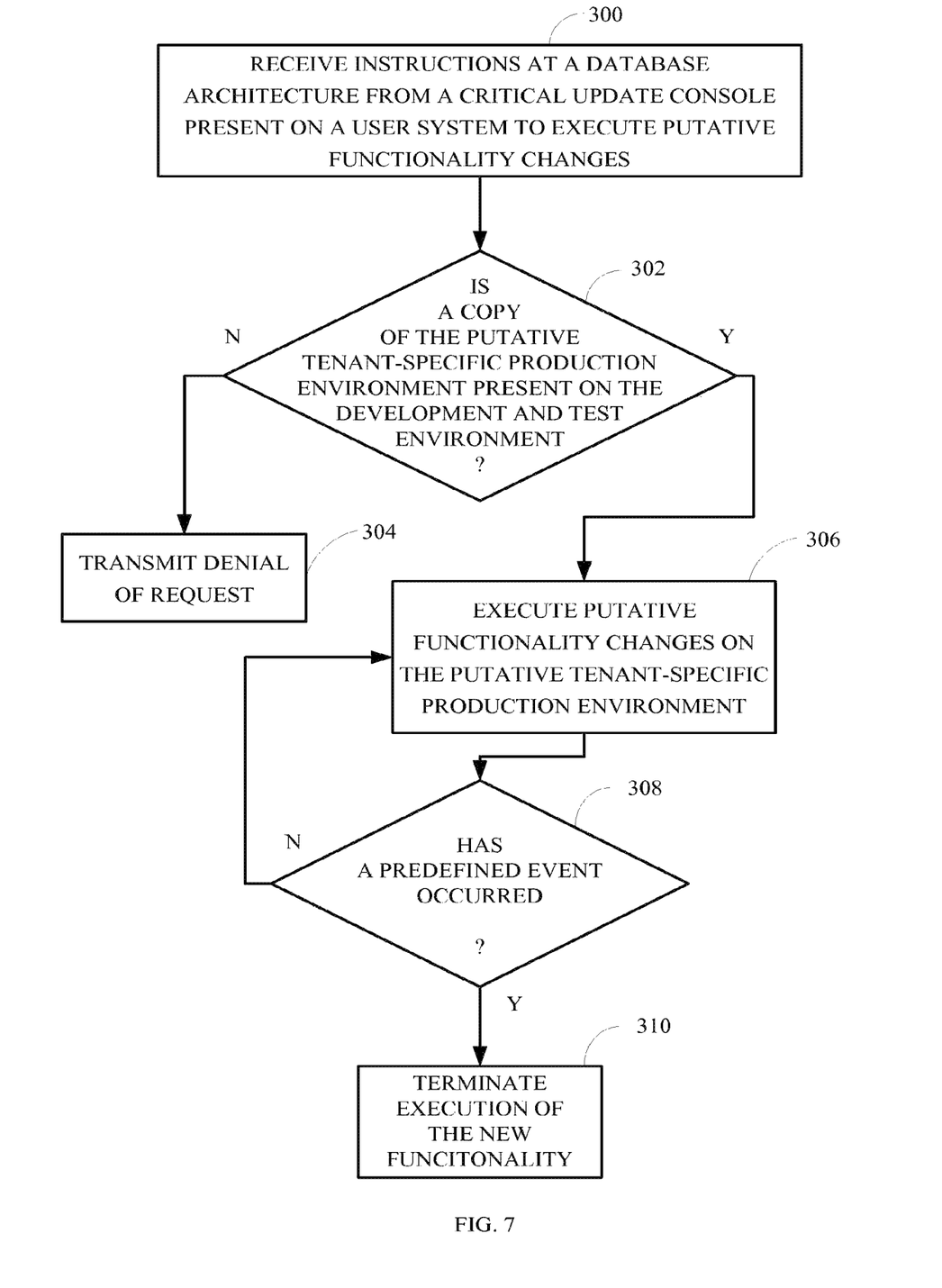
FIG. 7 is a flow diagram showing a method of allowing a user to temporarily use functionality to the architecture shown in FIG. 1, in accordance with one embodiment of the present invention.

Referring to both FIGS. 1 and 7, in accordance with an alternative embodiment of the present invention, one of the users may execute the functionality changes on the copy of the tenant-specific production environment copied to development and test environment 98. To that end, at step 300 instructions are received at architecture 10 from CRUC 120 present on user system 62 to execute the putative functionality changes. At step 302, it is determined whether a copy of the putative tenant-specific production environment is present on development and test environment 98. If not, a denial of request is transmitted to user system 62 at step 304. This may occur, for example, were the request transmitted after automatic activation of the functionality changes to have occurred. Otherwise, at step 306 execution of the putative functionality changes occur on the putative tenant-specific production environment. Following step 306, it is determined whether a pre-defined event has occurred at step 308. One example of the aforementioned event would be to receive a request from guest system 62 to terminate the execution of the functionality changes on the putative tenant-specific production environment. Another event would be the expiration of the duration of time at which point the functionality changes would be deployed to the tenant-specific production environment. If the pre-defined event did not occur, then step 306 occurs. Otherwise, step 310 occurs at which the execution of the new functionality changes on the putative tenant-specific production environment terminates.

Figure 8:
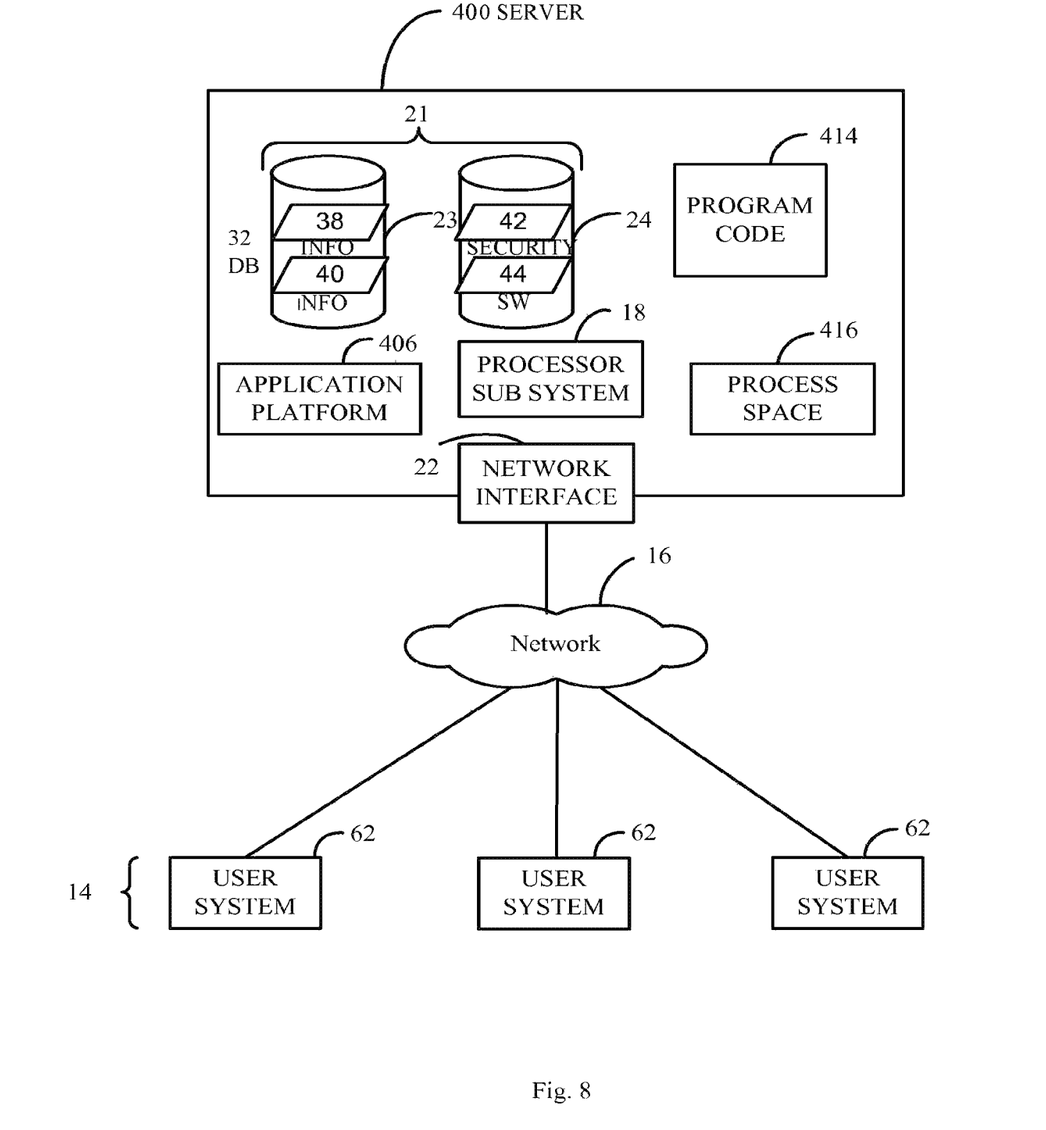
FIG. 8 illustrates a block diagram of an example of a representative system in which the architecture, shown in FIG. 1 may be practiced.

Referring to both FIGS. 1 and 8 a block diagram of a server system 400 employed to implement architecture 10 is shown as including multiple user systems 6 included in client side facilities 14 and in data communication with server system 400 over network 16. Server system 400 includes a processor sub-system 18, application platform 406, network interface 22, and drive storage 21 that includes database 32. In addition, server system 400 includes program code 414, and process space 416. Program code 414 may include, among other code to facilitate a tenant establishing rules concerning the information that will be pushed to, or withheld from, users 25-27 when accessing database 32. Process space 416 facilitates execution of MTS system processes and tenant-specific processes, such as running applications as part of an application hosting service. Additional processes that may execute on server system 400 include database indexing processes. In other embodiments, server system 400 may not have all of the components listed and/or may have other elements instead of, or in addition to, those listed above. Server system 400, and additional instances of an MTS, where more than one is present, and all components thereof may be operator configurable using applications including computer code to run using a central processing unit such as processor sub-system 18.

Application platform 406 may be a framework that allows the applications of architecture 10 to run, such as the hardware and/or software, e.g., the operating system. In an embodiment, application platform 406 may enable creation, managing and executing one or more applications developed by the owner/provider of architecture 10, users 25-27 accessing architecture 10 via user systems 402, or third party application developers accessing architecture 10 via user systems 402, as in the case of application exchange system 92.

In one embodiment, server system 400 implements a web-based customer relationship management (CRM) system. For example, server system 400 may include application servers (not shown) configured to implement and execute CRM software applications as well as provide related data, code, forms, webpages and other information to and from user systems 402 and to store to, and retrieve from, database system related data, objects, and webpage content. Architecture 10 typically store s data for multiple tenants in the same physical database object, however, tenant data typically is arranged so that data of one tenant is kept logically separate from that of other tenants so that one tenant does not have access to another tenant's data, unless such data is expressly shared. In certain embodiments, server system 400 implements applications other than, or in addition to, the CRM application discussed above. For example, server system 400 may provide tenant access to multiple hosted (standard and custom) applications, including a CRM application. User (or third party developer) applications, which may or may not include CRM, may be supported by the application platform 406, which manages creation, storage of the applications into one or more database objects and executing of the applications in a virtual machine in the process space of server system 400.

Referring to FIGS. 1 and 8, to facilitate web-based CRM, user systems 402 might communicate with server system 400 using TCP/IP and, at a higher network level, use other common Internet protocols to communicate, such as HTTP, FTP, AFS, WAP, etc. Data corresponding with each user 25-27 may be separate from the data corresponding to the remaining users 25-27 regardless of the tenant associated with users 25-27; however, some data might be shared or accessible by predetermined groups of a plurality of users 25-27 or all of users 25-27 associated with a tenant, such as the aforementioned push information. Thus, there might be some data structures managed by server system 400 that are allocated at the tenant level while other data structures might be managed at the user level. Because an MTS typically support multiple tenants including possible competitors, various embodiments of the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, server system 400 might also maintain system level data usable by multiple tenants or other data. Such system level data might include industry reports, news, postings, and the like that are sharable among tenants.

According to one embodiment, server system 400 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 9:
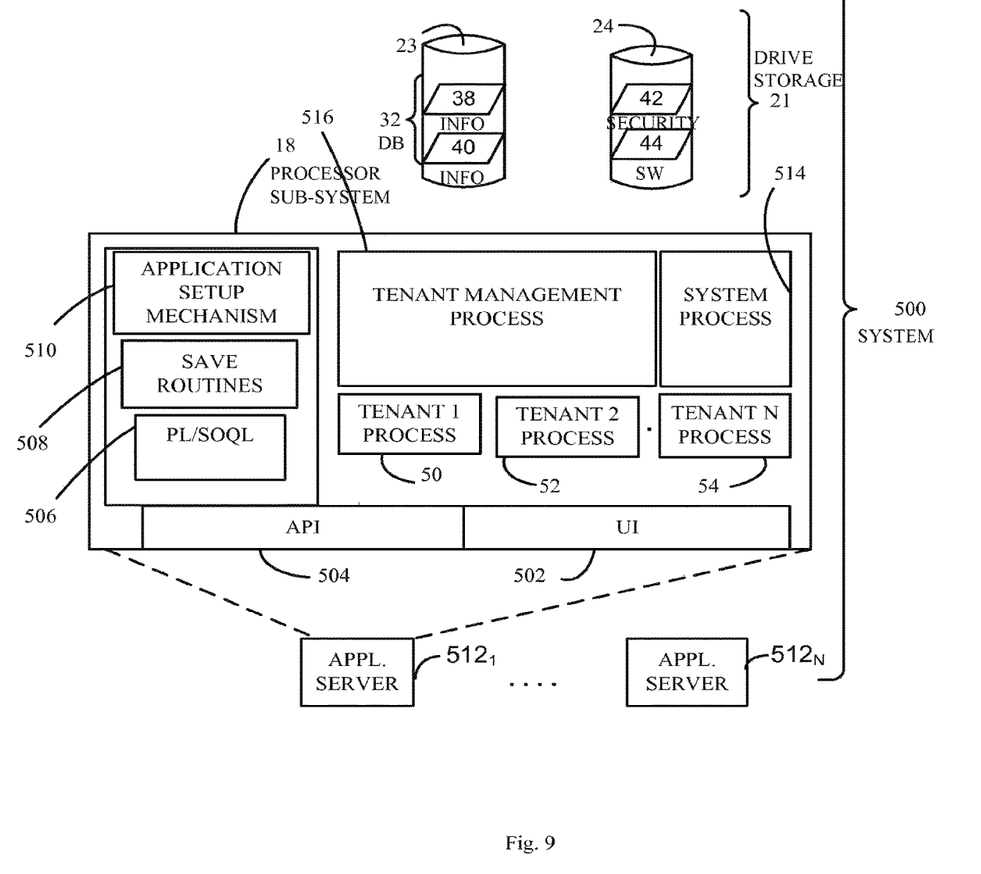
FIG. 9 illustrates a block diagram of an embodiment of elements of FIG. 8 and various possible interconnections between these elements.

Referring to FIG. 9, a specific embodiment of a server system 500 includes database 32, as discussed above, as well as processor sub-system 18 and a network interface 122. In addition, server system 500 includes a user interface (UI) 502, application program interface (API) 504, PL/SOQL 506, save routines 508, an application setup mechanism 510, applications servers $512_1$-$512_N$, system process space 514, tenant processes 50, 52 and 54, tenant management processes 516. User interface (UI) 502, application program interface (API) 504, PL/SOQL 506, save routines 508, an application setup mechanism 510, tenant processes 50, 52 and 54, tenant management processes 516 are shown as processes running in processor sub-system 18. However, it should be noted that the computer readable code to implement the processes may be stored on drive storage 31. In other embodiments, server system 500 may not have the same elements as those listed above and/or may have other elements instead of, or in addition to, those listed above. Network interface 122 is implemented as a plurality of HTTP application servers $512_1$-$512_N$.

Referring to FIGS. 1, 8 and 9, each application server 512 1-512N may be configured to service requests of user systems 402 for access to database 32. In this configuration, tenant information 38 and 40 consists of different information storage areas that may different physical systems, e.g., different hard disks, and/or a logical separation of the information on a common system and may include application metadata for each user or groups of users. For example, a copy of a user's most recently used (MRU) items might be included. Similarly, a copy of MRU items for an entire organization that is a tenant might be stored. UI 502 provides a user interface and API 504 provides an application programmer interface to server system 500 resident processes to users and/or developers at user systems 402. The tenant data and the system data may be stored in various databases, such as one or more Oracle™ databases.

Referring again to FIGS. 1, 8 and 9, it is not necessary that the one or more HTTP application servers $512_1$-$512_N$ be implemented as the sole network interface between server system 500 and network 16. Rather, other communication techniques might be used in conjunction with HTTP application servers 512 1-512N or in lieu thereof. In some implementations, the interface between server system 500 and network 16 includes load sharing functionality, such as round-robin HTTP request distributor s to balance loads and distribute incoming HTTP request s evenly over a plurality of servers. At least as for users 25-27 one of HTTP application servers $512_1$-$512_N$, each of the plurality of servers has access to the MTS data; however, other alternative configurations may be used instead.

Application platform 406 includes an application setup mechanism 510 that supports application developers' creation and management of applications, which may be saved as metadata by save routines 508 for execution by subscribers as one or more tenant process spaces 84 managed by tenant management process 86, for example. Invocations to such applications may be coded using PL/SOQL 506 that provides a programming language style interface extension to API 504. A detailed description of some PL/SOQL language embodiments is discussed in commonly owned co-pending U.S. patent application Ser. No. 11/859,498 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manage retrieving application metadata for the subscriber making the invocation and executing the metadata as an application in a virtual machine.

Each HTTP application servers $512_1$-$512_N$ may be communicably coupled to database systems, e.g., database 32, via a different network connection. For example, one HTTP application server $512_1$ might be coupled via the network 16 (e.g., the Internet), another HTTP application servers $512_1$-$512_N$ might be coupled via a direct network link, and another one of HTTP application servers $512_1$-$512_N$ might be coupled by yet a different network connection. Transfer Control Protocol and Internet Protocol (TCP/IP) are typical protocols for communicating between HTTP application servers $512_1$-$512_N$ and database 32. However, it will be apparent to one skilled in the art that other transport protocols may be used to optimize the system depending on the network interconnect used.

In certain embodiments, each of HTTP application servers $512_1$-$512_N$ is configured to handle requests for any user associated with any organization that is a tenant. Because it is desirable to be able to add and remove application servers from the server pool at any time for any reason, there is preferably no server affinity for a user and/or organization to a specific one of HTTP application servers $512_1$-$512_N$. In one embodiment, therefore, an interface system implementing a load balancing function (e.g., an F5 Big-IP load balancer) is communicably coupled between HTTP application servers 5121-512N and the user systems 402 to distribute requests to HTTP application servers 512 1-512N. In one embodiment, the load balancer uses a least connect ions algorithm to route user requests to HTTP application servers $512_1$-$512_N$. Other examples of load balancing algorithms, such as round robin and observed response time, also can be used. For example, in certain embodiments, three consecutive requests from the same user 25-27 could hit three different HTTP application servers 512₁-512N, and three requests from different user systems 402 could hit a common HTTP application server 512₁-512$_N$. In this manner, server system 500 is multi-tenant, wherein server system 500 handles storage of, and access to, different objects, data and applications across disparate users and organizations.

In certain embodiments, user systems 402 (which may be client systems) communicate with HTTP application servers 512 1-512N to request and update system-level and tenant-level data from server system 500 that may require sending one or more queries to database 32. Server system 500 (e.g., an application server 512 in server system 500) automatically generates one or more SQL statements (e.g., one or more SQL queries) that are designed to access the desired information. Database may generate query plans to access the requested data from the database.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, the present processes may be embodied as a computer program product that includes a machine-readable storage medium (media) having instructions stored thereon/in which can be used to program a computer to perform any of the processes of the embodiments described herein.

Computer code for operating and configuring the server system to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.). Therefore, the scope of the appended claims should be accorded the broadest interpretation so as to encompass all such modifications and similar arrangements.

What is claimed is:

1. A method comprising:
   identifying functional changes to be made to a database platform of a service provider by or on behalf of the service provider, wherein the database platform supports a plurality of tenants;
   identifying a tenant-specific production environment, within the database platform, impacted by the functional changes, the tenant-specific production environment being associated with one of the plurality of tenants supported by the database platform; and
   responsive to identifying the tenant-specific production environment impacted by the functional changes, providing users of the associated tenant an opportunity to assess an effect of the functional changes on the tenant-specific production environment prior to the functional changes being installed in the tenant-specific production environment by:
   copying tenant-specific business logic, functional changes and at least a portion of the tenant-specific production environment impacted by the functional changes to a tenant-specific test and development environment of the tenant;
   and
   notifying at least one of the users regarding the functional changes, including providing information regarding the functional changes and information regarding a point in time at which the functional changes will be deployed to the tenant-specific production environment;
   prior to the point in time at which the functional changes will be deployed to the tenant-specific production environment, testing the functional changes within the tenant-specific test and development environment;
   and
   on or after the point in time at which the functional changes will be deployed to the tenant-specific production environment, deploying the functional changes to the tenant-specific production environment.

2. The method of claim 1, wherein the tenant-specific production environment is impacted by the functional changes as a result of the tenant specific business logic customizing functionality of a database of the database platform.

3. The method of claim 2, wherein the tenant-specific business logic includes configuration information and customization information specified by the tenant and wherein the tenant-specific production environment provides customized functionality of one or more of: third party applications of the tenant or the database to the users based on the tenant-specific business logic.

4. The method of claim 2, wherein the tenant-specific business logic includes third party applications.

5. The method of claim 1, wherein said notifying comprises providing the information regarding the functional changes and the information regarding the point in time at which the functional changes will be deployed via a graphical interface of a user system.

6. The method of claim 5, wherein the graphical interface is displayed responsive to a user accessing the database platform.

7. The method of claim 5, wherein said notifying is in a form of a critical update console included in a set-up page or a configuration page of the graphical interface.

8. The method of claim 5, further comprising providing via the graphical interface an option for the tenant to indicate to the service provider that deployment of the functional changes need not be delayed.

9. The method of claim 5, further comprising providing via the graphical interface concurrent with access by a user to the tenant-specific production environment and the tenant-specific test and development environment.

10. A non-transitory computer-readable medium having stored thereon instructions that, when executed by one or more processors of a database platform of a service provider, cause the one or more processors to:
identify functional changes to be made to the database platform by or on behalf of the service provider, wherein the database platform supports a plurality of tenants;
identify a tenant-specific production environment, within the database platform, impacted by the functional changes, the tenant-specific production environment being associated with one of the plurality of tenants supported by the database platform; and
responsive to identifying the tenant-specific production environment impacted by the functional changes, provide users of the associated tenant an opportunity to assess an effect of the functional changes on the tenant-specific production environment prior to the functional changes being installed in the tenant-specific production environment by:
copying tenant-specific business logic, functional changes and at least a portion of the tenant-specific production environment impacted by the functional changes to a tenant-specific test and development environment of the tenant; and
notifying at least one of the users regarding the functional changes, including providing information regarding the functional changes and information regarding a point in time at which the functional changes will be deployed to the tenant-specific production environment;
prior to the point in time at which the functional changes will be deployed to the tenant-specific production environment, test the functional changes within the tenant-specific test and development environment; and
on or after the point in time at which the functional changes will be deployed to the tenant-specific production environment, deploy the functional changes to the tenant-specific production environment.

11. The non-transitory computer-readable medium of claim 10, wherein the tenant-specific production environment is impacted by the functional changes as a result of the tenant specific business logic customizing functionality of a database of the database platform.

12. The non-transitory computer-readable medium of claim 11, wherein the tenant-specific business logic includes configuration information and customization information specified by the tenant and wherein the tenant-specific production environment provides customized functionality of one or more of third party applications of the tenant or the database to the users based on the tenant-specific business logic.

13. The non-transitory computer-readable medium of claim 11, wherein the tenant-specific business logic includes third party applications.

14. The non-transitory computer-readable medium of claim 10, wherein said notifying comprises providing the information regarding the functional changes and the information regarding the point in time at which the functional changes will be deployed via a graphical interface of a user system.

15. The non-transitory computer-readable medium of claim 14, wherein the graphical interface is displayed responsive to a user accessing the database platform.

16. The non-transitory computer-readable medium of claim 14, wherein said notifying is in a form of a critical update console included in a set-up page or a configuration page of the graphical interface.

17. The non-transitory computer-readable medium of claim 14, wherein the instructions further cause the one or more processors to provide via the graphical interface an option for the tenant to indicate to the service provider that deployment of the functional changes need not be delayed.

18. The non-transitory computer-readable medium of claim of claim 14, wherein the instructions further cause the one or more processors to provide via the graphical interface concurrent with access by a user to the tenant-specific production environment and the tenant-specific test and development environment.

19. A system, comprising:
one or more processors; and
a memory, the processors configurable to:
identify functional changes to be made to the database platform by or on behalf of the service provider, wherein the database platform supports a plurality of tenants;
identify a tenant-specific production environment, within the database platform, impacted by the functional changes, the tenant-specific production environment being associated with one of the plurality of tenants supported by the database platform; and
responsive to identifying the tenant-specific production environment impacted by the functional changes, provide users of the associated tenant an opportunity to assess an effect of the functional changes on the tenant-specific production environment prior to the functional changes being installed in the tenant-specific production environment by:
copying tenant-specific business logic, functional changes and at least a portion of the tenant-specific production environment impacted by the functional changes to a tenant-specific test and development environment of the tenant; and
notifying at least one of the users regarding the functional changes, including providing information regarding the functional changes and information regarding a point in time at which the functional changes will be deployed to the tenant-specific production environment;
prior to the point in time at which the functional changes will be deployed to the tenant-specific production environment, test the functional changes within the tenant-specific test and development environment; and
on or after the point in time at which the functional changes will be deployed to the tenant-specific production environment, deploy the functional changes to the tenant-specific production environment.

20. The system of claim 19, the processors further configurable to:
facilitate testing the functional changes within the tenant-specific test and development environment of the tenant.

* * * * *